(12) United States Patent
Lee et al.

(10) Patent No.: US 7,566,411 B2
(45) Date of Patent: *Jul. 28, 2009

(54) COMPOSITE OXIDES COMPRISING STRONTIUM, LANTANIUM, YTTRIUM AND IONIC CONDUCTORS USING THE SAME

(75) Inventors: Eung Je Lee, Seoul (KR); Seung Tae Hong, Daejeon (KR)

(73) Assignee: LG Chem, Ltd., Seoul (KR)

(*) Notice: Subject to any disclaimer, the term of this patent is extended or adjusted under 35 U.S.C. 154(b) by 317 days.

This patent is subject to a terminal disclaimer.

(21) Appl. No.: 11/581,471

(22) Filed: Oct. 17, 2006

(65) Prior Publication Data

US 2007/0087249 A1    Apr. 19, 2007

(30) Foreign Application Priority Data

Oct. 17, 2005 (KR) .................. 10-2005-0097716

(51) Int. Cl.
C01F 11/00 (2006.01)
H01B 1/08 (2006.01)
(52) U.S. Cl. .................. 252/520.5; 252/521.1
(58) Field of Classification Search ........... 252/520.5, 252/521.1; 423/594.17, 593.1
See application file for complete search history.

(56) References Cited

U.S. PATENT DOCUMENTS

| | | | |
|---|---|---|---|
| 5,213,911 A | 5/1993 | Bloom et al. | |
| 5,403,461 A | 4/1995 | Tuller et al. | |
| 6,287,716 B1 | 9/2001 | Hashimoto et al. | |
| 7,413,687 B2 * | 8/2008 | Armstrong et al. | 252/518.1 |
| 2004/0062968 A1 | 4/2004 | Tanner | |
| 2006/0051278 A1 * | 3/2006 | Hong et al. | 423/263 |
| 2007/0087249 A1 * | 4/2007 | Lee et al. | 429/33 |
| 2007/0111074 A1 * | 5/2007 | Park et al. | 429/33 |

FOREIGN PATENT DOCUMENTS

| | | | |
|---|---|---|---|
| JP | 02221125 A | * | 9/1990 |
| KR | 100137165 B1 | | 2/1998 |
| KR | 10-20010071921 A | | 7/2001 |
| KR | 100310186 B1 | | 9/2001 |
| KR | 1020030055285 A | | 7/2003 |
| WO | WO 2006/066918 | * | 6/2006 |

OTHER PUBLICATIONS

International tables for crystallography (vol. A, 5th ed. Kluwer Academic Publishers, 2002) p. 361, space group No. 88, origin choice 2.
T. Norby ; "Solid-state protonic conductors: principles, properties, progress and prospects"; Solid Ionics, 125 (1999), 1-11; Department of Chemistry, University of Oslo, Centre for Materials Science, Gaustadalleen 21, N-0349 Oslo, Norway.
T. Norby, et al.: "Incorporation of water in strontium tantalates with perovskite-related structure"; Department of Chemistry, Ural State University, 620083 Ekaterinburg, Russia; University of Oslo, Centre for Materials Science, Gaustadalleen 21, N-0349 Oslo, Norway Solid State Ionics, 145, (2001) 357-364; Received Sep. 25, 2000; received in revised from Jan. 19, 2001; accepted Feb. 20, 2001.

* cited by examiner

Primary Examiner—Mark Kopec
(74) Attorney, Agent, or Firm—McKenna Long & Aldridge LLP

(57) ABSTRACT

Disclosed is a novel strontium-lanthanum-yttrium-containing metal composite oxide. An ionic conductor comprising the metal composite oxide and an electrochemical device comprising the ionic conductor are also disclosed. The metal composite oxide has an improved ionic conductivity, because formation of an open space within a lattice is ensured by the defects of metal ion sites in the lattice. Therefore, the metal composite oxide is useful for an ionic conductor or an electrochemical device requiring ionic conductivity.

12 Claims, 4 Drawing Sheets

COMPOSITE OXIDES COMPRISING STRONTIUM, LANTANIUM, YTTRIUM AND IONIC CONDUCTORS USING THE SAME

This application claims the benefit of the filing date of Korean Patent Application No. 2005-97716, filed on Oct. 17, 2005, in the Korean Intellectual Property Office, the disclosure of which is incorporated herein in its entirety by reference.

TECHNICAL FIELD

The present invention relates to a novel metal composite oxide that exhibits ionic conductivity. More particularly, the present invention relates to a strontium-lanthanum-yttrium-containing metal composite oxide with an open space formed for easy movement and transfer of ions due to metal ion defects in a crystal lattice, an ionic conductor comprising the novel metal composite oxide and an electrochemical device comprising the ionic conductor.

BACKGROUND ART

Active studies have been carried out to ionic conductors, particularly oxygen ion conductors, which are electrolytes used in electrochemical devices, such as gas sensors and fuel cells.

Currently, in solid oxide fuel cell ("SOFC") applications, it is known that yttrium stabilized zirconia ("YSZ") is the most suitable material for use as a high-temperature SOFC electrolyte. However, a doped ceria-type is more suitable for a low-temperature (lower than 600° C.) SOFC. In a high-temperature SOFC using any other electrolyte (doped ceria or $La_{0.8}Sr_{0.2}GaO_{3-\delta}$) than YSZ, materials such as $La_{0.9}Sr_{0.1}AlO_{3-\delta}$ or $Gd_2Zr_2O_7$ can be used as a protective layer of a cathode. An ionic conductor membrane for use in an oxygen pump should have both electrical conductivity and ionic conductivity. Accordingly, doped ceria, rather than YSZ with very low electrical conductivity, is suitable for being used in an oxygen pump.

Although all the materials as described above have a certain potential in industrial applications, they have merits and demerits depending on particular application to which they are applied. It is thought that this is because each material shows different ionic conductivity characteristics and physicochemical properties depending on temperatures due to its unique feature such as crystalline structure or ion defect structure. Therefore, it is very important to develop new materials having various ionic conductivity characteristics required for various applications. Such materials may result in the rapid development of relevant technologies requiring ion conductors.

BRIEF DESCRIPTION OF THE DRAWINGS

The foregoing and other objects, features and advantages of the present invention will become more apparent from the following detailed description when taken in conjunction with the accompanying drawings in which.

DISCLOSURE OF THE INVENTION

The inventors have discovered that a novel metal composite oxide essentially comprising strontium (Sr), lanthanum (La) and yttrium (Y) mixed with at least one different chemical species has specific metal ion defects that have not been known to date and shows an improved ionic conductivity by ensuring the formation of an open space within a crystal lattice by the metal ion defects.

Therefore, it is an object of the present invention to provide a novel metal composite oxide having ionic conductivity, an ionic conductor comprising the metal composite oxide, and an electrochemical device comprising the ionic conductor.

The present invention provides a novel metal composite oxide represented by the following Formula 1, an ionic conductor comprising the metal composite oxide, and an electrochemical device comprising the ionic conductor:

[Formula 1]

$$Sr_{5+x+y}La_{6-x-2y}Y_yB_4O_{24-\delta}C_z \qquad (I)$$

wherein B is at least one element selected from the group consisting of Ta and Nb;

C is at least one anion selected from the group consisting of S and halogen atoms, or $H^+$ cation;

x is a decimal ranging from −1 to 1 (−1≦x≦1);

y is a decimal ranging from 0 to 2.5 (0≦y≦2.5);

δ is a decimal ranging from 0 to 3 (0≦δ≦3); and z is a decimal ranging from 0 to 7 (0≦z≦7).

Also, the present invention provides an ionic conductor, which has ordered metal defects in a lattice structure of perovskite-like $\sqrt{2}\times\sqrt{2}\times4$ super structure.

Hereinafter, the present invention will be explained in more detail.

The novel metal composite oxide according to the present invention is characterized by having improved ionic conductivity due to the presence of unique metal ion defects in a lattice.

The novel metal composite oxide according to the present invention has ordered metal defects in specific metal sites in a lattice structure. Herein, the metal defects are not conventional defects that are randomly positioned and disordered in a lattice structure, but ordered in specific sites. Such metal defects can ensure formation of an additional open space in a lattice structure, and the open space facilitates ion movements, so as to impart improved ionic conductivity. Hence, the novel metal composite oxide according to the present invention may be expected to serve sufficiently as an ionic conductor showing conductivity according to the ion movement and transfer.

Figure 3:
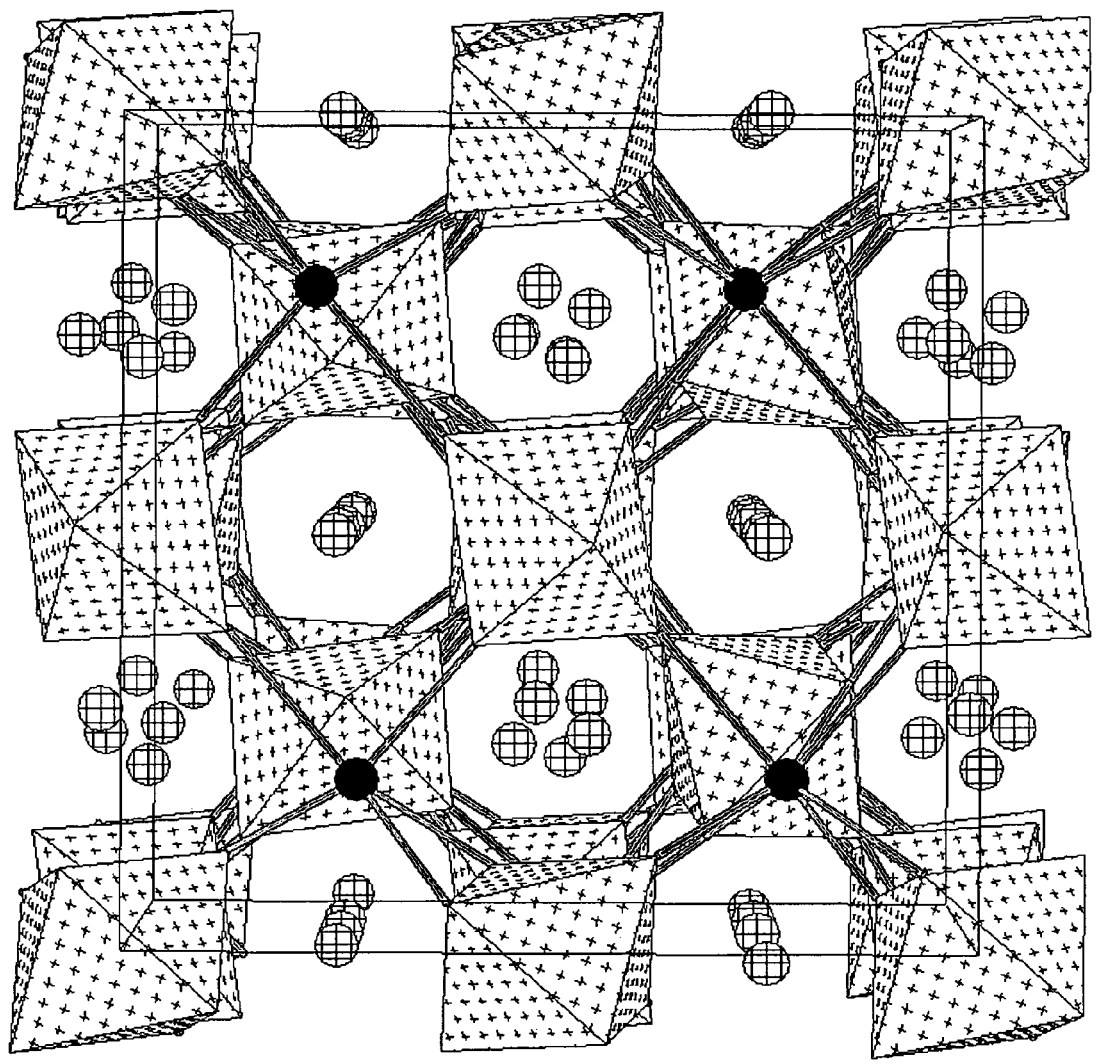
FIG. 3 is a lattice structure view of the strontium-lanthanum-yttrium-containing metal composite oxide ($Sr_5La_6Ta_4O_{21}$) prepared in Example 1.
Figure 4:
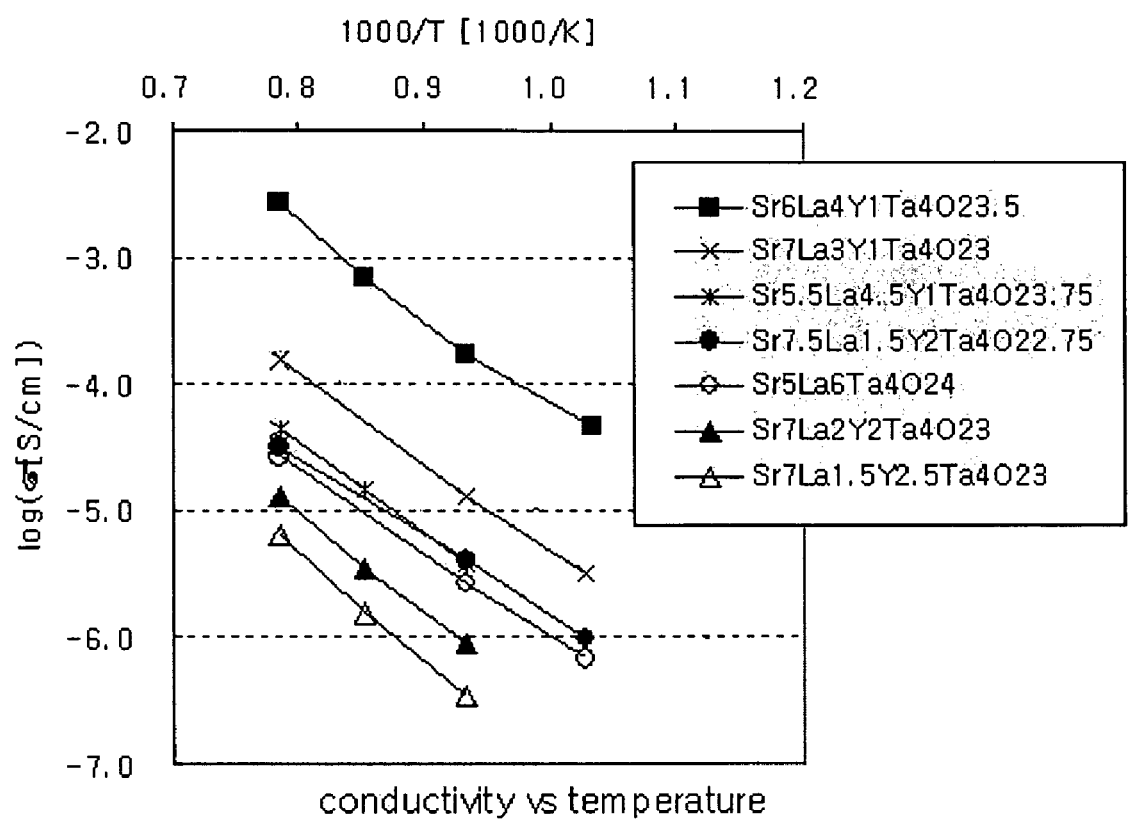
FIG. 4 is a graph showing ionic conductivity of the strontium-lanthanum-yttrium-containing metal composite oxides prepared in Examples 1~7 as a function of temperature.

In fact, as can be seen from the following experimental examples, the metal composite oxide according to the present invention, represented by the above Formula 1, includes specific metal ion defects and has a high oxygen ionic conductivity (see Table 2 and FIGS. 3 and 4).

In addition, according to another feature of the present invention, the compound represented by Formula 1 can provide diverse ionic conductivity characteristics, without any significant change in crystal structure, merely by slightly modifying the composition of chemical species forming the compound. This indicates that when two or more kinds of materials having different electrical conductivities are required to be bonded with each other in solid oxide fuel cell or gas sensor applications, the metal composite oxide represented by Formula 1 may be suitably applied thereto merely by modifying the chemical composition of the metal composite oxide without any significant change in crystal structure so as to adopt materials having diverse ionic conductivity characteristics. Therefore, the present invention may result in the rapid development of relevant technologies requiring ionic conductivity.

The novel metal composite oxide according to the present invention is represented by the above Formula 1.

The metal composite oxides represented by Formula 1 is a novel composite oxide that has never been disclosed to date, while it includes metal ion defects ordered in the lattice structure. Therefore, the metal composite oxide ensures formation of an open space within the lattice due to the presence of the metal defects, thereby showing excellent ionic conductivity.

Preferably, the metal ion defects have crystallographic coordinates of 4a position (x=0, y=0.25, z=0.125) after a proper lattice translation if needed and a site occupancy of 0~1, but are not limited thereto. Herein, the crystallographic coordinates in the lattice are based on space group No. 88, origin choice 2, described in p. 361 of "International tables for crystallography" (vol. A, $5^{th}$ ed. Kluwer Academic Publishers, 2002).

In the metal composite oxide represented by Formula 1, C is preferably an $H^+$ cation (proton). This is because $H^+$ (proton) present in the lattice due to the absorption of moisture ($H_2O$) included in a wet atmosphere can easily move through the open space formed by the metal ion defects, as mentioned above, and function as an ionic conductor.

In practice, it is known that many perovskite-like oxides having oxygen ionic conductivity generally show hydrogen ionic conductivity in a moisture-containing atmosphere (T. Norby, Solid State Ionics, 125 (1999) 1-11; I. Animitsa, T. Norby, S. Marion, R. Glockner, A. Neiman, Solid State Ionics, 145, (2001) 357-364). In view of this fact, it is assumed that the metal composite oxide according to the present invention, which includes specific metal ion defects and show oxygen ionic conductivity through an open space formed by such metal ion defects, may also allow hydrogen ions (protons) to easily move through the open space, and thus exhibit both oxygen ionic conductivity and hydrogen ionic conductivity.

The metal composite oxide represented by Formula 1 may have a crystal structure of the perovskite structure or perovskite-like $2\sqrt{2}\times2\sqrt{2}\times4$ super structure. Also, the metal composite oxide may have a tetragonal crystal system, whose space group is $I4_1/a$ (space group No. 88), and the crystal system may have the following lattice parameters: $a=11.661\pm0.5$ Å and $c=16.577\pm0.5$ Å. However, the scope of the present invention is not limited thereto.

Non-limiting examples of the metal composite oxide represented by Formula 1 include $Sr_5La_6Ta_4O_{24}$, $Sr_{5.5}La_{4.5}Y_1Ta_4O_{23.75}$, $Sr_6La_4Y_1Ta_4O_{23.5}$, $Sr_7La_{1.5}Y_{2.5}Ta_4O_{23}$, $Sr_7La_2Y_2Ta_4O_{23}$, $Sr_7La_3Y_2Ta_4O_{23}$, $Sr_{7.5}La_{1.5}Y_2Ta_4O_{22.75}$, or the like.

Besides the compound represented by Formula 1 or derivatives thereof, any compounds having the aforementioned structural features and showing ionic conductivity may also be included in the scope of the present invention. For example, the metal composite oxide prepared by using Nb element instead of Ta, includes metal ion defects ordered in the lattice structure, thereby shows excellent ionic conductivity.

The metal composite oxide according to the present invention can be prepared by conventional methods generally known to those skilled in the art. For example, the metal composite oxide can be prepared by mixing precursor compounds each containing one or more elements specified in Formula 1 (e.g. (a) Sr, La, Y or a combination thereof; and (b) Ta, Nb or a combination thereof, or the like), at an appropriate molar ratio, calcining the resultant mixture at a temperature between 700° C. and 1,700° C., and then cooling the mixture.

As the precursor compounds of the metal composite oxide of Formula 1, any salts containing one or more elements selected from the group consisting of (a) Sr, La and Y; and (b) Ta, Nb, etc. can be used. There is no limitation in the molar ratio of the precursor compounds. The precursor compounds can be mixed together at an appropriate molar ratio determined according to the final product.

Preferably, the mixture of the precursor compounds is calcined at a temperature above 700° C., preferably between 700° C. and 1,700° C., for 5 to 72 hours.

For the calcination process, the following conventional methods can be used: a first method of forming the mixture in a pellet and calcining the pellet; and a second method of calcining the mixture itself. However, there is no limitation in using any calcination method.

The calcined mixture is cooled to room temperature to obtain a single-phase metal composite oxide having the novel crystal structure according to the present invention (for example, a strontium-lanthanum-yttrium-niobium (or tantalum) oxide and derivatives thereof). The cooling process can be carried out at room temperature. Alternatively, the calcined mixture can be rapidly cooled by using liquid nitrogen or water at room temperature.

The present invention provides ionic conductors including metal composite oxides with the novel crystal structure, preferably, oxygen- or proton-selective ionic conductors.

Ionic conductors are materials that conduct electricity with the movement of ions. Generally, ionic conductors are used in the form of a membrane having a separating factor through which one element selectively permeates.

The ionic conductors according to the present invention can be prepared by using a conventional method generally known in the art. For example, the ionic conductor can be prepared by coating a conductive electrode to apply an electric field. At this time, a metal composite oxide of the present invention can be used alone as an ionic conductor or mixed appropriately with any other materials known in the art according to purposes or applications.

In addition, the present invention provides electrochemical devices comprising metal composite oxides having the novel crystal structure as ionic conductors.

The electrochemical devices can be any device for performing electrochemical reactions, which includes, but is not limited to, an oxygen probe, a fuel cell, a chemical membrane reactor, an oxygen separation membrane, an oxygen pump, a hydrogen separation membrane, a hydrogen pump, a hydrogen gas sensor, a steam sensor, a hydrocarbon sensor, a hydrogen extraction, a hydrogen pressure controller, isotope enrichment, tritium technology, steam electrolysis, $H_2S$ electrolysis, HCl electrolysis, hydrogenation of hydrocarbon, dehydrogenation, $NH_3$ formation, an electrochemical cell, an electrochromic device, a gas sensor or a $NO_x$ trap.

The metal composite oxides included in the electrochemical devices according to the present invention plays a role as an oxygen or proton ionic conductor. Accordingly, the metal composite oxide can be used for electrochemical filtration through a porous filter, electrochemical treatment of a gas-state efflux or heterogeneous catalysis. The metal composite oxides can also be used in a chemical membrane reaction of a reactor for controlling oxidation of hydrocarbon or incorporated into an oxygen separation membrane. In addition, the metal composite oxides can be used as an electrolyte of a fuel cell that uses hydrogen as a fuel.

Further, the present invention provides an ionic conductor, which has ordered metal defects in a lattice structure of perovskite-like $2\sqrt{2} \times 2\sqrt{2} \times 4$ super structure. Herein, crystallographic coordinates of the metal defects may be the same as described above but are not limited thereto.

In the ionic conductor, movement and transfer of ions can be facilitated by the open space formed in a lattice due to the metal defects. The ionic conductor according to the present invention may include any compound with no particular limitation, as long as the compound facilitates movement of ions due to the aforementioned structural features. However, the ionic conductor according to the present preferably includes the metal composite oxide represented by the above Formula 1.

BEST MODE FOR CARRYING OUT THE INVENTION

Reference will now be made in detail to the preferred embodiments of the present invention. It is to be understood that the following examples are illustrative only and the present invention is not limited thereto.

EXAMPLES 1~7

Preparation of Novel Metal Composite Oxides

Example 1

Strontium carbonate ($SrCO_3$), lanthanum oxide ($La_2O_3$) and yttrium oxide ($Y_2O_3$) were weighed and mixed at a metal-based molar ratio of 5:6:0:4. The resultant mixture was heated at a temperature of 1,000° C. for 48 hours. The heated mixture was cooled to room temperature and remixed so as to be in a powder state or to form pellets. The powder or pellets were heated in air at 1,300° C. for 48 hours, and then cooled to complete the preparation of compound $Sr_5La_6Ta_4O_{24}$.

Example 2

Example 1 was repeated to provide compound $Sr_{5.5}La_{4.5}Y_1Ta_4O_{23.75}$, except that strontium carbonate, lanthanum oxide, yttrium oxide and tantalum oxide were used in a molar ratio of 5.5:4.5:1:4 instead of 5:6:0:4.

Example 3

Example 1 was repeated to provide compound $Sr_6La_{4.5}Y_1Ta_4O_{23.5}$, except that strontium carbonate, lanthanum oxide, yttrium oxide and tantalum oxide were used in a molar ratio of 6:4:1:4 instead of 5:6:0:4.

Example 4

Example 1 was repeated to provide compound $Sr_7La_{1.5}Y_{2.5}Ta_4O_{23}$, except that strontium carbonate, lanthanum oxide, yttrium oxide and tantalum oxide were used in a molar ratio of 7:1.5:2.5:4 instead of 5:6:0:4.

Example 5

Example 1 was repeated to provide compound $Sr_7La_2Y_2Ta_4O_{23}$, except that strontium carbonate, lanthanum oxide, yttrium oxide and tantalum oxide were used in a molar ratio of 7:2:2:4 instead of 5:6:0:4.

Example 6

Example 1 was repeated to provide compound $Sr_7La_3Y_1Ta_4O_{23}$, except that strontium carbonate, lanthanum oxide, yttrium oxide and tantalum oxide were used in a molar ratio of 7:3:1:4 instead of 5:6:0:4.

Example 7

Example 1 was repeated to provide compound $Sr_7La_{1.5}Y_{2.5}Ta_4O_{23}$, except that strontium carbonate, lanthanum oxide, yttrium oxide and tantalum oxide were used in a molar ratio of 7.5:1.5:2:4 instead of 5:6:0:4.

EXPERIMENTAL EXAMPLE 1

Analysis of Chemical Compositions of Metal Composite Oxides (ICP-AES)

The chemical compositions of the metal composite oxides according to the present invention were analyzed by ICP-AES (Inductively Coupled Plasma Atomic Emission Spectroscope).

As a sample, the strontium-lanthanum-yttrium-tantalum-containing composite oxide prepared in Example 1 was used. The sample was pulverized, poured into a glass vial, dissolved with concentrated nitric acid and completely decomposed by using hydrogen peroxide. The sample was diluted to three different volumes and analyzed by a standard method using ICP-AES (GDC Integra XMP).

After ICP elemental analysis was performed on the sample, it was shown that the molar ratio of strontium, lanthanum, yttrium and tantalum is 5.00:6.00:0.00:4.00 (±0.02) in the metal composite oxide according to Example 1. The mole number of oxygen was calculated to be 24 based on the oxidation numbers of the metals and the above molar ratio. Consequently, it was confirmed that the strontium-lanthanum-yttrium-tantalum-containing oxide according to Example 1 can be represented by $Sr_5La_6Ta_4O_{24}$. The chemical compositions of the metal composite oxides according to Examples 2~7 could be confirmed in a similar manner.

EXPERIMENTAL EXAMPLE 2

Analysis of Crystal Structures of Metal Composite Oxides

The following analysis was performed to analyze the crystallographic structures of the metal composite oxides according to the present invention.

2-1. Analysis of Crystal Structure Using X-ray Diffraction Pattern (XRDP)

As samples for diffraction analysis, the strontium-lanthanum-yttrium-containing composite oxides prepared in Examples 1~7 were used. Each sample was pulverized and filled in a sample holder for X-ray powder diffraction. Each sample was scanned by using Bruker D8-Advance XRD with CuK$\alpha_1$ ($\lambda$=1.5405 Å) radiation at an applied voltage of 40 kV and an applied current of 50 mA and with a step size of 0.02°.

Figure 1:
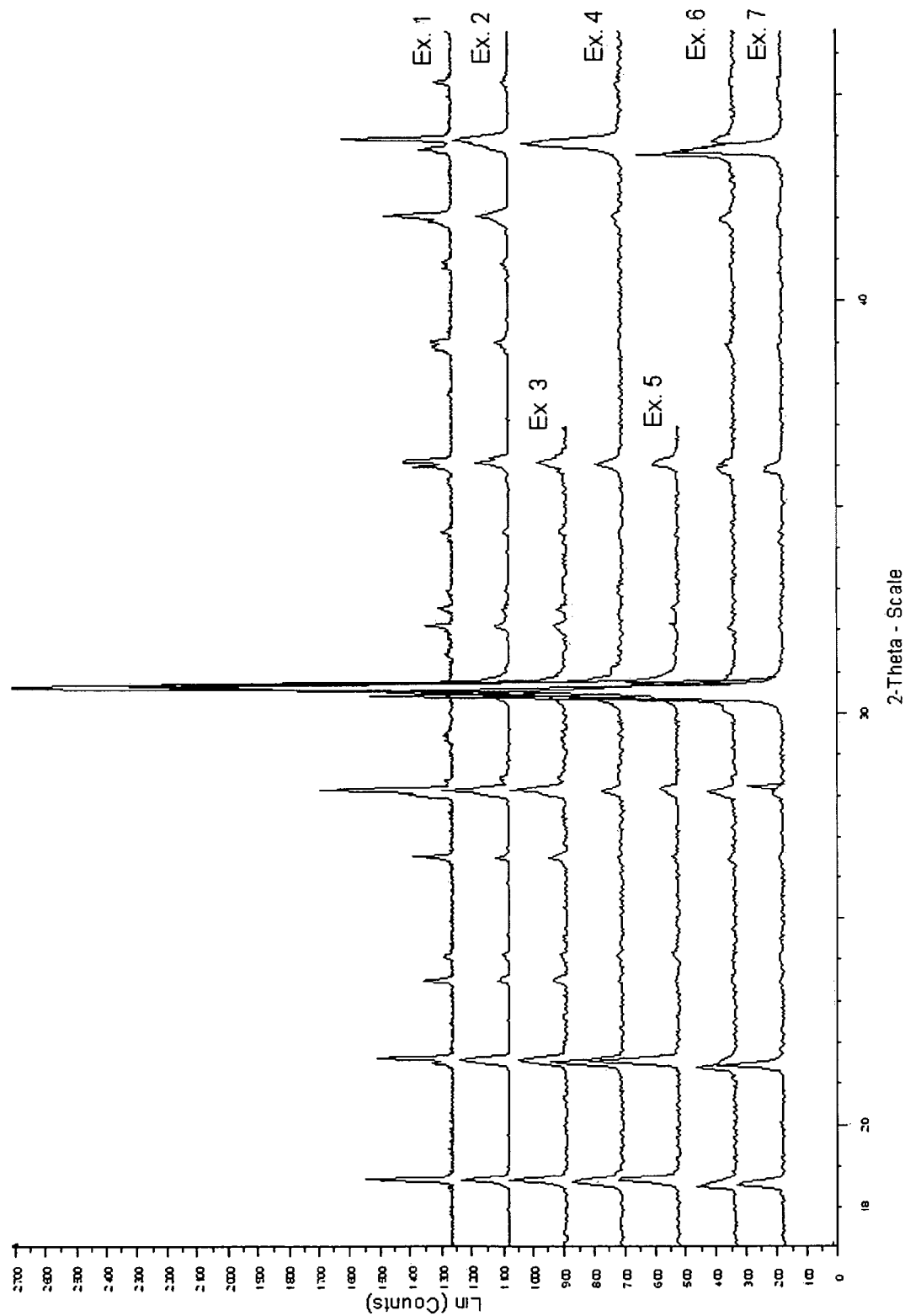
FIG. 1 is a graph showing the X-ray diffraction (XRD) patterns of the strontium-lanthanum-yttrium-containing metal composite oxides prepared in Examples 1~7.

After reviewing each X-ray diffraction pattern (XRDP) obtained from the metal composite oxides according to Examples 1~7, lattice parameters of a=11.661±0.5 Å and c=16.577±0.5 Å were obtained from the positions of the XRDP peaks. After indexing all peaks and observing the extinction rule in each diffraction pattern, a space group of $I4_1/a$ was determined (see Table 1 and FIG. 1). In addition, from the XRDPs with all peaks indexed, it was confirmed that each of metal composite oxides according to the present invention is in a pure single phase with no impurity.

TABLE 1

| Examples | Composition | Space group | Lattice parameters [Å] |
|---|---|---|---|
| 1 | $Sr_5La_6Ta_4O_{24}$ | $I4_1/a$ | a = 11.661, c = 16.577 |
| 2 | $Sr_{5.5}La_{4.5}Y_1Ta_4O_{23.75}$ | $I4_1/a$ | a = 11.672, c = 16.467 |
| 3 | $Sr_6La_4Y_1Ta_4O_{23.5}$ | $I4_1/a$ | a = 11.694, c = 16.475 |
| 4 | $Sr_7La_{1.5}Y_{2.5}Ta_4O_{23}$ | $I4_1/a$ | a = 11.692, c = 16.512 |
| 5 | $Sr_7La_2Y_2Ta_4O_{23}$ | $I4_1/a$ | a = 11.669, c = 16.558 |
| 6 | $Sr_7La_3Y_1Ta_4O_{23}$ | $I4_1/a$ | a = 11.729, c = 16.463 |
| 7 | $Sr_{7.5}La_{1.5}Y_2Ta_4O_{22.75}$ | $I4_1/a$ | a = 11.701, c = 16.571 |

2-2. Setting of Structural Model and Rietveld Refinement Analysis Results

To determine the crystal structure of the metal composite oxides according to the present invention, all peaks obtained from Experimental Example 2-1 were analyzed by carrying out LeBail fitting with the GSAS program (A. C. Larson and R. B. Von Dreele, "General Structure Analysis System," Report no. LAUR086-748, Los Alamos National Laboratory, Los Alamos, N. Mex. 87545), so as to obtain structural factors. Then, the metal composite oxides according to the present invention were subjected to crystal structure analysis by using the crystal structure solution of a single crystal based on CRYSTALS (D. J. Watkin, C. K. Prout, J. R. Carruthers, P. W. Betteridge, CRYSTALS, Issue 10; Chemical Crystallography Laboratory, University of Oxford: Oxford, U.K. 1996). And Rietveld refinement analysis was performed for each XRD pattern by taking the (x,y,z) coordinates of atoms, site occupancies and temperature factors as parameters. After the Rietveld analysis, the reliability of the structural model set by the inventors of the present invention was $R_w$=6.1%. The final crystallographic data obtained from the analysis are shown in the following Table 2.

Figure 2:
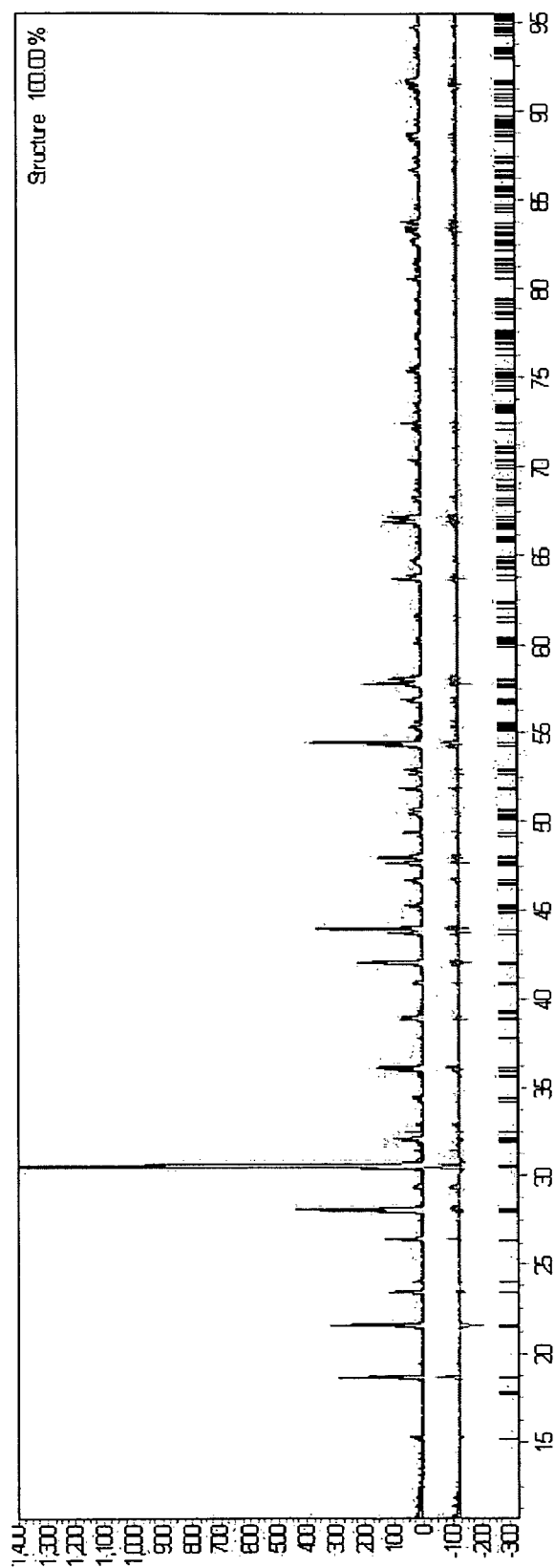
FIG. 2 is a Rietveld profile illustrating the XRD pattern of the strontium-lanthanum-yttrium-containing metal composite oxide ($Sr_5La_6Ta_4O_{21}$) prepared in Example 1 when compared with the theoretical pattern of a structure model.

In addition, it can be seen from FIG. 2 showing a Rietveld profile that the pattern measured from the metal composite oxides conforms to the theoretical pattern of the structural model. In other words, the difference peaks observed below the Bragg position in the Rietveld profile indicate that the measured peaks conform to the simulation peaks of the structural model in all measurement sections. This demonstrates that the crystal structure determination in Table 2 using the structural model is correct, and the metal composite oxides according to the present invention are in a single phase.

Particularly, it is to be noted that metal ion defects are in an ordered state in the crystal structure, wherein the metal ion defect sites have crystallographic coordinates of position 4a (x=0, y=0.25, z=0.125).

TABLE 2

| Atom | Site | X | Y | z | Occup. | Beq |
|---|---|---|---|---|---|---|
| Sr1 | 16f | 0.2945 (7) | 0.0174 (7) | 0.8654 (5) | 0.5 | 1 |
| La1 | 16f | 0.2945 (7) | 0.0174 (7) | 0.8654 (5) | 0.5 | 1 |
| La2 | 16f | 0.2078 (6) | 0.2250 (7) | 0.0352 (4) | 1 | 1 |
| Ta1 | 8c | 0 | 0 | 0 | 1 | 1 |
| Ta2 | 8d | 0 | 0 | 0.5 | 1 | 1 |
| Sr2 | 8e | 0 | 0.25 | 0.3843 (7) | 1 | 1 |
| Sr3 | 4b | 0 | 0.25 | 0.625 | 1 | 1 |
| O1 | 16f | 0.936 (7) | 0.383 (8) | 0.089 (4) | 1 | 1 |
| O2 | 16f | 0.383 (7) | 0.374 (6) | 0.027 (4) | 1 | 1 |
| O3 | 16f | 0.491 (7) | 0.951 (6) | 0.113 (3) | 1 | 1 |
| O4 | 16f | 0.367 (6) | 0.090 (5) | 0.007 (4) | 1 | 1 |
| O5 | 16f | 0.880 (7) | 0.125 (7) | 0.968 (4) | 1 | 1 |
| O6 | 16f | 0.102 (6) | 0.568 (6) | 0.077 (4) | 1 | 1 |

Atomic positions in $Sr_5La_6Ta_4O_{24}$ with space group No. 88, origin choice 2, and a = 11.661 ± 0.5☐, c = 16.577 ± 0.5☐.

For reference, FIG. 3 is a crystal lattice structure view of $Sr_5La_6Ta_4O_{24}$ as shown in Table 2. Herein, $TaO_6$ molecules are illustrated as dotted octahedrons. Also, La atoms and Sr atoms are illustrated as filled circles and hatched circles, respectively, in the lattice structure. Additionally, La—O bonding is illustrated as thick lines. It can be seen that the octahedrons form an interconnection channel between each other.

EXPERIMENTAL EXAMPLE 3

Evaluation of Oxygen Ionic Conductivity

The following experiment was carried out to evaluate the ionic conductivity of the metal composite oxides prepared according to the present invention.

As samples, the strontium-lanthanum-yttrium-containing composite oxides according to Examples 1~7 were used. Conductivity of each sample was measured according to the DC four-terminal method as a function of temperature. More particularly, each sample was sintered at a higher temperature than the temperature where the sample was prepared, and then it was processed into the form of a bar. Then, strip-like porous Pt electrodes were applied to four positions including both ends and the middle portion of the sample piece to form electrodes. A voltage drop was read at the two inner electrodes, while allowing electric current to flow through the two outer electrodes. At this time, electric current was applied in such a range that the voltage can be maintained in a range between −1V and 1V. The resistance and conductivity of each sample were calculated from the voltage and current measured as described above. For reference, the total conductivity measured by the two methods exists within a range of experimental error as compared to the total conductivity measured in the air and the total conductivity measured in nitrogen atmosphere. Therefore, the overall conductivity can be regarded as ionic conductivity.

After the experiment, it can be seen that the metal composite oxides having various chemical compositions according to the present invention exhibit an excellent oxygen ionic conductivity at various temperatures (see FIG. 4). It is thought that such excellent oxygen ionic conductivity of the metal composite oxide according to the present invention results from the open space formed within the lattice by the metal ion defects present in the crystal structure. Therefore, the metal composite oxide of the present invention can be used as an ionic conductor.

INDUSTRIAL APPLICABILITY

As can be seen from the foregoing, the metal composite oxide according to the present invention has an improved ionic conductivity, because formation of an open space within a lattice is ensured by the defects of metal ion sites in the lattice. Therefore, the metal composite oxide of the present invention is useful for an ionic conductor or an electrochemical device requiring ionic conductivity.

While this invention has been described in connection with what is presently considered to be the most practical and preferred embodiment, it is to be understood that the invention is not limited to the disclosed embodiment and the drawings. On the contrary, it is intended to cover various modifications and variations within the spirit and scope of the appended claims.

The invention claimed is:

1. A metal composite oxide represented by the following Formula 1:

[Formula 1]

$$Sr_{5+x+y}La_{6-x-2y}Y_yB_4O_{24-\delta}C_z \qquad (I)$$

wherein B is at least one element selected from the group consisting of Ta and Nb;

C is at least one anion selected from the group consisting of S and halogen atoms, or $H^+$ cation;

x is a decimal ranging from −1 to 1 (−1≦x≦1);

y is a decimal ranging from 0 to 2.5 (0≦y≦2.5);

δ is a decimal ranging from 0 to 3 (0≦δ≦3); and z is a decimal ranging from 0 to 7 (0≦z≦7).

2. The metal composite oxide according to claim 1, which includes specific metal ion defects present in an ordered state in a lattice structure.

3. The metal composite oxide according to claim 2, wherein the metal ion defects have crystallographic coordinates of 4a (x=0, y=0.25, z=0.125).

4. The metal composite oxide according to claim 1, which has a tetragonal crystal system.

5. The metal composite oxide according to claim 1, which belongs to a space group of I4$_1$/a, whose lattice parameters include: a=11.661±0.5 Å and c=16.577±0.5 Å.

6. The metal composite oxide according to claim 1, which is at least one composite oxide selected from the group consisting of $Sr_5La_6Ta_4O_{24}$, $Sr_{5.5}La_{4.5}Y_1Ta_4O_{23.75}$, $Sr_6La_4Y_1Ta_4O_{23.5}$, $Sr_7La_{1.5}Y_{2.5}Ta_4O_{23}$, $Sr_7La_2Y_2Ta_4O_{23}$, $Sr_7La_3Y_1Ta_4O_{23}$ and $Sr_{7.5}La_{1.5}Y_2Ta_4O_{22.75}$.

7. An ionic conductor comprising the metal composite oxide as defined in claim 1, wherein the metal composite oxide represented by the following Formula 1:

[Formula 1]

$$Sr_{5+x+y}La_{6-x-2y}Y_yB_4O_{24-\delta}C_z \qquad (I)$$

wherein B is at least one element selected from the group consisting of Ta and Nb;

C is at least one anion selected from the group consisting of S and halogen atoms, or $H^+$ cation;

x is a decimal ranging from −1 to 1 (−1≦x≦1);

y is a decimal ranging from 0 to 2.5 (0≦y≦2.5);

δ is a decimal ranging from 0 to 3 (0≦δ≦3); and z is a decimal ranging from 0 to 7 (0≦z≦7).

8. The ionic conductor according to claim 7, wherein the metal composite oxide includes specific metal ion defects present in an ordered state in a lattice structure.

9. The ionic conductor according to claim 7, wherein the metal ion defects have crystallographic coordinates of 4a (x=0, y=0.25, z=0.125).

10. The ionic conductor according to claim 7, which is oxygen- or proton ($H^+$)-selective.

11. An electrochemical device comprising the ionic conductor as defined in claim 7.

12. The electrochemical device according to claim 11, which is selected from the group consisting of an oxygen probe, a fuel cell, a chemical membrane reactor, an oxygen separation membrane, an oxygen pump, a hydrogen separation membrane, a hydrogen pump, a hydrogen gas sensor, a steam sensor, a hydrocarbon sensor, a hydrogen extraction, a hydrogen pressure controller, isotope enrichment, tritium technology, steam electrolysis, $H_2S$ electrolysis, HCl electrolysis, hydrogenation of hydrocarbon, dehydrogenation, $NH_3$ formation, an electrochemical cell, an electrochromic device, a gas sensor, or a $NO_x$ trap.

* * * * *